G. H. NICHOLLS.
COMBINATION DRIPPER AND STEEPER.
APPLICATION FILED OCT. 22, 1919.

1,366,824.

Patented Jan. 25, 1921.

WITNESSES

INVENTOR
G. H. Nicholls,
BY
ATTORNEYS

UNITED STATES PATENT OFFICE.

GEORGE HABBERTON NICHOLLS, OF BEAUMONT, TEXAS.

COMBINATION DRIPPER AND STEEPER.

1,366,824. Specification of Letters Patent. Patented Jan. 25, 1921.

Application filed October 22, 1919. Serial No. 332,460.

*To all whom it may concern:*

Be it known that I, GEORGE HABBERTON NICHOLLS, a citizen of the United States, and a resident of Beaumont, in the county of Jefferson and State of Texas, have invented certain new and useful Improvements in Combination Drippers and Steepers, of which the following is a specification.

My invention is an improvement in combination drippers and steepers, and has for its object to provide a device of the character specified for preparing beverages such as tea and coffee, wherein a strainer is provided for supporting the material to be steeped, the said strainer having means for engaging the top of a tea or coffee pot to support the strainer in the tea or coffee pot with the material to be steeped in the water or out of the same.

Figure 1:
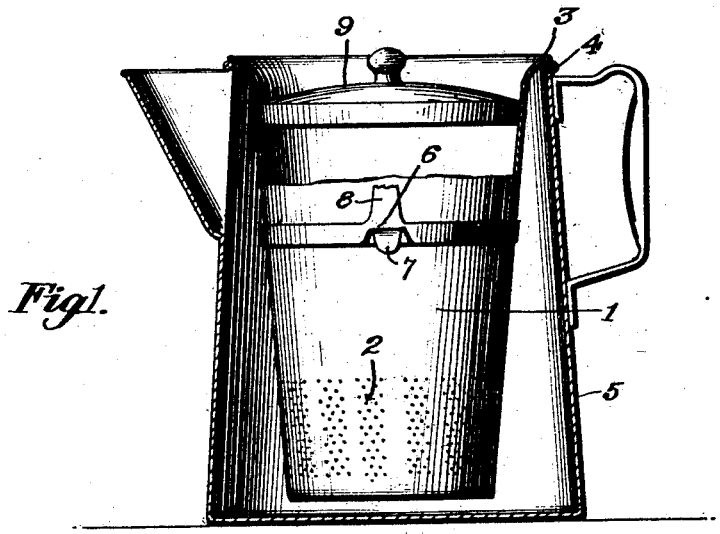
Figure 1 is a longitudinal section of a coffee or tea pot with the improved dripper and steeper in lowered position.

In the present embodiment of the invention a suitable container 1 is provided, in the present instance of frusto-conical form, arranged with the small end downward and having the small end closed and forming the bottom of the container. The container is provided with annular series of perforations 2 in its side wall, and in its bottom, for permitting the infusion to drain away from the container, and at its top the container has an outwardly flaring flange 3. This flange is adapted to engage the bead 4 at the top of a tea or coffee pot 5 of usual construction, and the container is of such length that when the flange is so engaged the bottom of the container will be spaced a short distance above the bottom of the pot.

Figure 2:
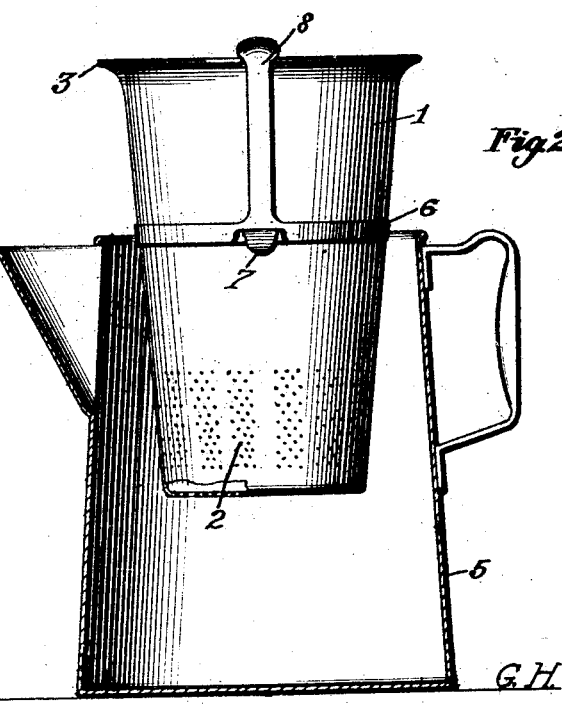
Fig. 2 is a similar view, with the device in draining position.

Intermediate its ends the container has a ring 6 secured thereto and this ring is provided with hooks 7 at its opposite sides for engaging over the bead of the coffee pot to support the container in the position shown in Fig. 2, that is, in draining position, with the perforations 2 above the level of the water in the pot. From the ring a handle 8 extends upwardly to above the flange 3, for convenience in manipulating the container, and a suitable cover 9 is provided, fitting into the top of the container, and forming a handle for convenience in handling the cover.

In operation, the tea or coffee is placed in the container, and it is lowered by means of the handle 8 into the water in the pot, taking the position shown in Fig. 1. After the material has been sufficiently steeped the container is raised until the hooks 7 engage the bead of the coffee pot, and the device is now supported out of the water in the pot, in position for draining. The perforations 2 may be of any desired size and number for the purpose.

Referring to Fig. 2 it will be noticed that the flange 3 at the top of the container 1 is notched to permit the passage of the handle 8.

I claim:

1. A device of the character specified comprising a container having an open top and having perforations in its side wall near its bottom, said container having a marginally extending flange at its top for engaging the top of a coffee pot, and having hooks intermediate its ends for engaging the top of the pot to support the container with its bottom out of contact with the water in the pot, a ring encircling the container from which the hooks extend, said ring having a handle extending above the top of the container, said container being frusto-conical and having its large end upward.

2. A device of the character specified comprising a perforate container having a marginally extending flange at its top for engaging the top of a coffee pot, and having hooks intermediate its ends for engaging the top of the pot to support the container with its bottom out of contact with the water in the pot, and a ring encircling the container from which the hooks extend, said ring having a handle extending above the top of the container.

3. A device of the character specified comprising a perforate container having a marginally extending flange at its top for engaging the top of a coffee pot, and having hooks intermediate its ends for engaging the top of the pot to support the container with its bottom out of contact with the water in the pot.

4. A device of the character specified, comprising a perforate container having means at its top for engaging the top of a pot to support the container in the pot and having means intermediate its top and bottom for engaging the top of the pot to support the container out of the water in the pot.

GEORGE HABBERTON NICHOLLS.